United States Patent
Banker et al.

(10) Patent No.: US 9,403,528 B2
(45) Date of Patent: Aug. 2, 2016

(54) METHOD AND ASSEMBLY FOR DIRECTING POWER WITHIN AN ELECTRIFIED VEHICLE

(71) Applicant: FORD GLOBAL TECHNOLOGIES, LLC, Dearborn, MI (US)

(72) Inventors: Adam Nathan Banker, Canton, MI (US); Jeffrey Allen Doering, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 14/335,244

(22) Filed: Jul. 18, 2014

(65) Prior Publication Data

US 2016/0016578 A1  Jan. 21, 2016

(51) Int. Cl.
| | |
|---|---|
| *G06F 17/00* | (2006.01) |
| *B60W 20/00* | (2016.01) |
| *B60W 10/06* | (2006.01) |
| *B60W 10/08* | (2006.01) |
| *B60W 10/26* | (2006.01) |
| *B60W 10/30* | (2006.01) |

(52) U.S. Cl.
CPC .............. *B60W 20/10* (2013.01); *B60W 10/06* (2013.01); *B60W 10/08* (2013.01); *B60W 10/26* (2013.01); *B60W 10/30* (2013.01); *B60W 2510/06* (2013.01); *B60W 2510/246* (2013.01); *B60W 2550/12* (2013.01); *B60W 2710/086* (2013.01); *Y02T 10/6286* (2013.01); *Y02T 90/14* (2013.01); *Y10S 903/93* (2013.01)

(58) Field of Classification Search
CPC combination set(s) only.
See application file for complete search history.

(56) References Cited

U.S. PATENT DOCUMENTS

| | | | |
|---|---|---|---|
| 5,291,960 A | 3/1994 | Brandenburg et al. | |
| 5,416,702 A * | 5/1995 | Kitagawa | B60L 1/003 180/65.31 |
| 5,531,285 A * | 7/1996 | Green | B60H 1/004 123/142.5 E |
| 8,600,598 B2 | 12/2013 | Simonini et al. | |
| 2001/0039230 A1* | 11/2001 | Severinsky | B60H 1/004 477/3 |
| 2008/0183348 A1* | 7/2008 | Arita | B60W 10/06 701/22 |
| 2010/0043414 A1* | 2/2010 | Hirose | B60K 6/365 60/320 |
| 2010/0106351 A1* | 4/2010 | Hanssen | B60K 6/48 701/22 |
| 2010/0152938 A1* | 6/2010 | Aoki | B60W 20/16 701/22 |
| 2010/0218916 A1 | 9/2010 | Miller et al. | |
| 2012/0041629 A1* | 2/2012 | Yamada | B60K 6/48 701/22 |
| 2012/0203404 A1 | 8/2012 | Mituta et al. | |
| 2013/0217540 A1 | 8/2013 | Ulrey et al. | |
| 2014/0070013 A1 | 3/2014 | Stanek et al. | |
| 2014/0109872 A1 | 4/2014 | Porras et al. | |
| 2014/0163803 A1* | 6/2014 | Kamatani | B60K 6/445 701/22 |
| 2015/0275787 A1* | 10/2015 | Dufford | F02D 29/02 701/102 |

FOREIGN PATENT DOCUMENTS

JP  2013216283 A  10/2013

* cited by examiner

*Primary Examiner* — Thomas Tarcza
*Assistant Examiner* — Edward J Pipala
(74) *Attorney, Agent, or Firm* — Carlson, Gaskey & Olds, P.C.

(57) ABSTRACT

An exemplary method directing power within an electrified vehicle includes generating electric power with an electric machine of an electrified vehicle. The method directs a first percentage of the electric power to a first use and a second percentage of the electric power to a second use. The method adjusts the first percentage and the second percentage in response to demand for an internal combustion engine of the electrified vehicle.

20 Claims, 3 Drawing Sheets

METHOD AND ASSEMBLY FOR DIRECTING POWER WITHIN AN ELECTRIFIED VEHICLE

BACKGROUND

Generally, electrified vehicles differ from conventional motor vehicles because electrified vehicles include one or more electric machines powered by batteries. The electric machines can selectively drive the vehicle. Conventional motor vehicles, in contrast to electrified vehicles, are driven exclusively by an internal combustion engine. Example electrified vehicles include all-electric vehicles, hybrid electric vehicles (HEVs), plug-in hybrid electric vehicles (PHEVs), fuel cell vehicles, and battery electric vehicles (BEVs).

The electric machines of some electrified vehicles can be used as generators to generate electric power. The electric power is used to charge batteries. In addition to electric machines and batteries, electrified vehicles can include many other components and fluids. Some electrified vehicles, such as HEVs, include internal combustion engines.

SUMMARY

A method according to an exemplary aspect of the present disclosure includes, among other things, generating electric power with an electric machine of an electrified vehicle, directing a first percentage of the electric power to a first use and a second percentage of the electric power to a second use, and adjusting the first percentage and the second percentage in response to demand for an internal combustion engine of the electrified vehicle.

In another example of the foregoing method, the first use is charging a battery of the electrified vehicle and the second use is generating thermal energy.

In another example of any of the foregoing methods, the method includes heating a portion of the internal combustion engine with the thermal energy.

In another example of any of the foregoing methods, the method includes heating a fluid of the internal combustion engine with the thermal energy.

In another example of any of the foregoing methods, the method includes heating an area of the electrified vehicle with the thermal energy.

In another example of any of the foregoing methods, demand for the internal combustion engine comprises calculating whether the internal combustion engine will be operated during a drive cycle.

In another example of any of the foregoing methods, the method includes using information from a navigation system when calculating whether the internal combustion engine will be operated during the drive cycle.

In another example of any of the foregoing methods, the method includes adjusting the directing in response to a state of charge of the battery.

In another example of any of the foregoing methods, the method includes adjusting the directing in response to a temperature of the battery.

In another example of any of the foregoing methods, the method includes adjusting the directing in response to an ambient temperature.

In another example of any of the foregoing methods, the generating is provided by regenerative braking.

An electrified vehicle assembly according to another exemplary aspect of the present disclosure includes, among other things, an electric machine to generate a first percentage of electric power that is directed to a first device and a second percentage of electric power that is directed to a second device. The assembly includes a controller to change the first percentage and the second percentage in response to a demand for an internal combustion engine.

In another example of the foregoing assembly, the first device is a battery of the electrified vehicle charged by the electric power and the second device is a heating element powered by the electric power to provide thermal energy.

In another example of any of the foregoing assemblies, the assembly includes a portion of the internal combustion engine heated by thermal energy from the heating element.

In another example of any of the foregoing assemblies, the assembly includes a fluid of the internal combustion engine is heated by thermal energy from the heating element.

In another example of any of the foregoing assemblies, the assembly includes an area of the electrified vehicle heated by thermal energy from the heating element.

In another example of any of the foregoing assemblies, demand for the internal combustion engine is based at least in part on whether the internal combustion engine will be operated during a drive cycle.

In another example of any of the foregoing assemblies, the assembly includes a navigation system to calculate whether the internal combustion engine will be operated during the drive cycle.

In another example of any of the foregoing assemblies, the controller selectively directs electric power from the electric machine to the first device, the second device, or the combination of the first device and the second device, in response to a state of charge of the battery.

In another example of any of the foregoing assemblies, the controller selectively directs electric power from the electric machine to the first device, the second device, or the combination of the first device and the second device, in response to a temperature of the battery in response to a temperature of the battery, an ambient temperature, or both.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to heating components and fluids of an electrified vehicle. More particularly, this disclosure is directed toward adjusting how the components and fluids are heated in response to demand for those components and fluids. An electric machine of the electrified vehicle provides thermal energy for the heating.

Figure 1:
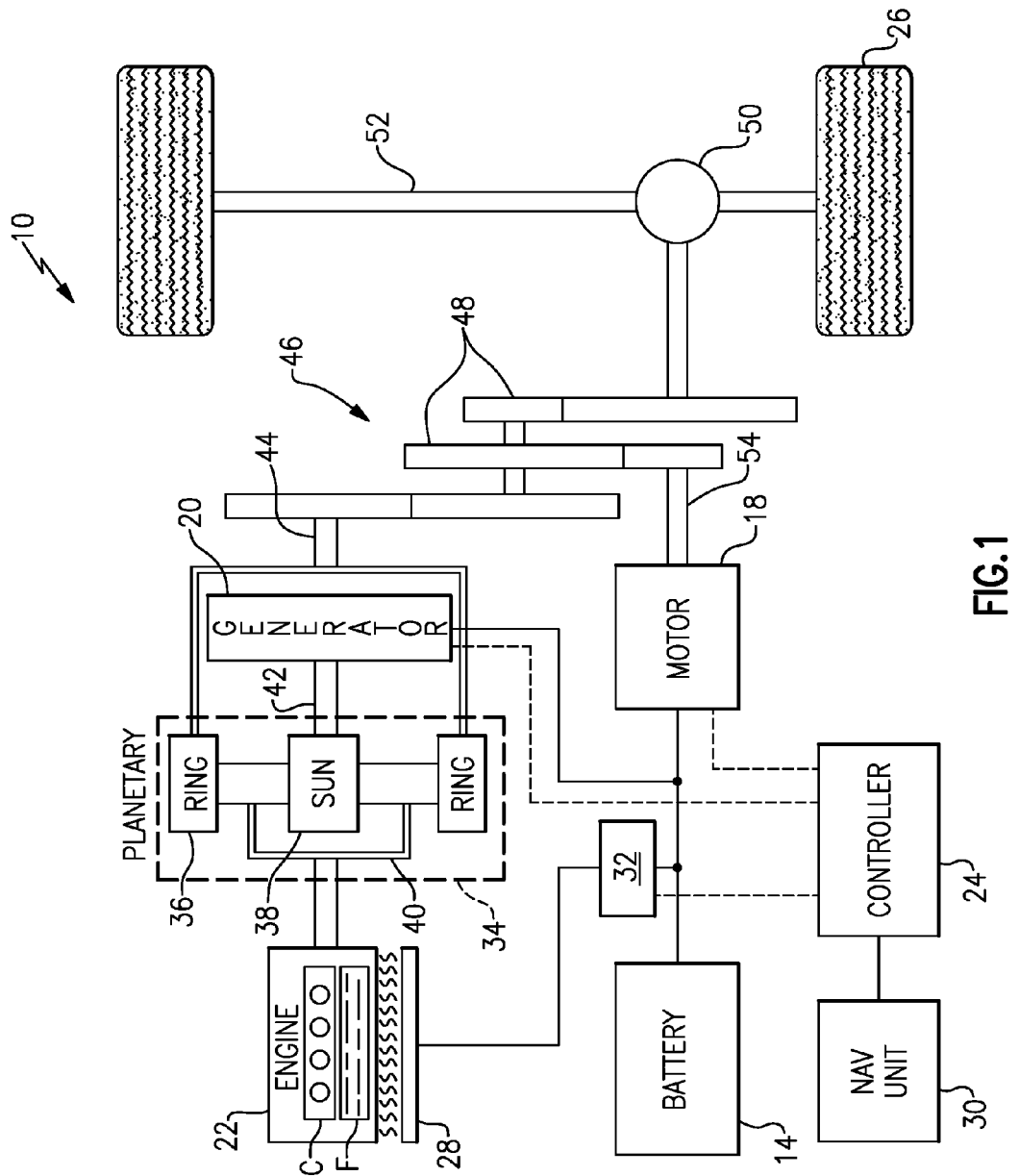
FIG. 1 shows a schematic view of an example electrified vehicle powertrain.

FIG. 1 schematically illustrates a powertrain 10 for an electrified vehicle. The powertrain 10 includes a battery 14, a motor 18, a generator 20, an internal combustion engine 22, and a controller 24. Although depicted as a powertrain for a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In this example embodiment, the powertrain 10 is a power-split powertrain system that employs a first drive system and a second drive system. The first drive system includes a combination of the engine 22 and the generator 20. The second drive system includes at least the motor 18, the generator 20, and the battery 14. The first and second drive systems generate torque to drive one or more sets of vehicle drive wheels 26 of the electrified vehicle.

The motor 18 and generator 20 of the power-split powertrain 10 are types of electric machines. The motor 18, the generator 20, or both can be used to generate electric power during regenerative braking, for example. That is, depending on requirements, the motor 18 can be used as a generator, and the generator 20 can be used as a motor.

The motor 18 and generator 20 can be separate components, as shown, or have the form of a combined motor/generator, such as in a parallel hybrid with the motor/generator sandwiched between the engine and the transmission. If the motor 18 and generator 20 are a combined motor/generator, the combined motor/generator can generate electric power.

In the example power-split powertrain 10, the controller 24 directs power generated by the electric machines to the battery 14 for a first use, to a heating element 28 for a second use, or to both the first use and second use. The controller 24 changes how the power is directed to the first use and the second use in response to demand for the engine 22. In FIG. 1, the dashed lines from the controller 24 represent control signals.

In this example, charging the battery 14 is considered a first use for power from the generator 20 and powering the heating element 28 is considered a second use for the power from the generator 20.

Directing power generated by the generator 20 to the battery 14 charges the battery.

Directing power generated by the generator to the heating element 28 generates thermal energy, in this example. The heating element 28 is located near the engine 22. The heating element 28 can be an electrically powered heater coil, heat tape, etc.

Thermal energy from the heating element 28 can heat fluids F of the engine 22. Heating the fluids F may take place when the fluids F are inside or outside the engine 22. The fluids F could be heated outside the engine 22 and then circulated directly to the engine 22, for example. Heating the fluids F can occur when the engine 22 is idle or when the engine 22 running. Heating the fluids F can improve the operating efficiency of the engine.

Thermal energy from the heating element 28 can heat components C of the engine 22, such as the pistons, engine case, fluid conduits, catalysts, etc. or other components of the electrified vehicle. Heating the components C can take place when the engine 22 is idle or when the engine 22 is running. Heating the components C can improve the operating efficiency of the engine 22.

The example second use is powering the heating element 28 to heat the components C or the fluids F. Other example second uses can include charging a secondary 12-Volt battery or heating another area of the electrified vehicle. Still other example second uses can include powering a cooler to chill the battery 14, the engine 22, a cabin of the electrified vehicle, etc.

The controller 24 may use information from a navigation unit 30 when calculating how to direct the electric power from the generator 20. The navigation unit 30 can, for example, provide information about a planned route for a drive cycle. With this information, the controller 24 can determine whether or not the internal combustion engine 22 will be used during that drive cycle. Information about the planned route could also be collected from something other than the navigation unit 30, such as from a stored preplanned route or shipping documentation.

If the engine 22 will be used during the drive cycle, some or all of the electric power from the generator 20 can be directed to the heating element 28 at some time during the drive cycle. If the engine 22 will not be used during the drive cycle, electric power from the generator 20 is used to charge the battery 14.

Adjusting the electric power to the heating element 28, the battery 14, or both may incorporate varistors 32. The heating element 28 could be a low-voltage or a high-voltage heating element.

Other types of adjustment devices could be used in other examples, such as a pulse width modulated signal with a duty cycle that is varied to control an amount of electric power directed to the heating element 28. In such an example, the remaining electric power would be directed to the battery 14.

The engine 22, which is an internal combustion engine in this example, and the generator 20 may be connected through a power transfer unit 34, such as a planetary gear set. Of course, other types of power transfer units, including other gear sets and transmissions, may be used to connect the engine 22 to the generator 20. In one non-limiting embodiment, the power transfer unit 34 is a planetary gear set that includes a ring gear 36, a sun gear 38, and a carrier assembly 40.

The generator 20 can be driven by engine 22 through the power transfer unit 34 to convert kinetic energy to electrical energy. The generator 20 can alternatively function as a motor to convert electrical energy into kinetic energy, thereby outputting torque to a shaft 42 connected to the power transfer unit 34. Because the generator 20 is operatively connected to the engine 22, the speed of the engine 22 can be controlled by the generator 20.

The ring gear 36 of the power transfer unit 34 may be connected to a shaft 44, which is connected to vehicle drive wheels 26 through a second power transfer unit 46. The second power transfer unit 46 may include a gear set having a plurality of gears 48. Other power transfer units may also be suitable. The gears 48 transfer torque from the engine 22 to a differential 50 to ultimately provide traction to the vehicle drive wheels 26. The differential 50 may include a plurality of gears that enable the transfer of torque to the vehicle drive wheels 26. In this example, the second power transfer unit 46 is mechanically coupled to an axle 52 through the differential 50 to distribute torque to the vehicle drive wheels 26.

The motor 18 can also be employed to drive the vehicle drive wheels 26 by outputting torque to a shaft 54 that is also connected to the second power transfer unit 46. In one embodiment, the motor 18 and the generator 20 cooperate as part of a regenerative braking system in which both the motor 18 and the generator 20 can be employed as generators to output torque. For example, the motor 18 and the generator 20 can each output electrical power to the battery 14.

The battery 14 is an example type of electrified vehicle battery assembly. The battery 14 may be a relatively high-voltage battery that is capable of outputting electrical power to operate the motor 18 and the generator 20. Other types of energy storage devices and/or output devices can also be used with the powertrain 10.

The example controller 24 is an inverter system controller combined with a variable voltage converter (ISC/VVC). In other examples, the controller 24 is part of an engine control module, a battery electric control, etc. within the vehicle.

The example controller 24 includes a processor 64 operatively linked to a memory portion 68. The example processor 64 is programmed to execute a program stored in the memory portion 68. The program may be stored in the memory portion 68 as software code.

The program stored in the memory portion 68 may include one or more additional or separate programs, each of which includes an ordered listing of executable instructions for implementing logical functions.

The processor 64 can be a custom made or commercially available processor, a central processing unit (CPU), an auxiliary processor among several processors associated with the controller 24, a semiconductor based microprocessor (in the form of a microchip or chip set) or generally any device for executing software instructions.

The memory portion 68 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

Figure 2:
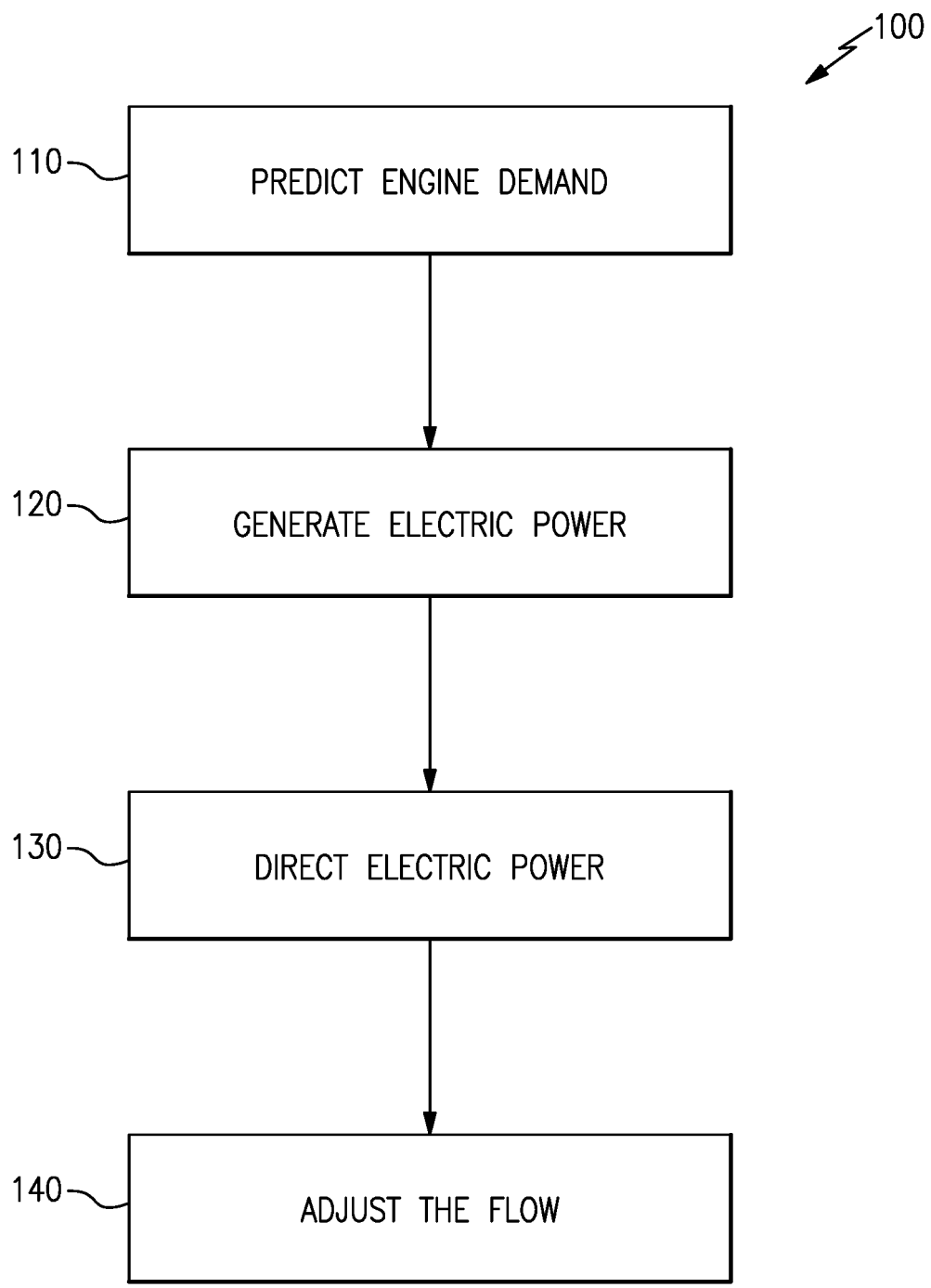
FIG. 2 illustrates a flow of an example method of directing power generated by the electrified vehicle powertrain.

Referring now to FIG. 2 with continued reference to FIG. 1, the example controller 24 is configured to execute a program that performs steps of a method 100. In a step 110 of the method 100, the controller 24 runs calculations to predict whether the engine 22 will be used during a drive cycle and how the engine 22 will be used. The controller 24 calculation can be based on a destination entered into the navigation unit 30 of a driver, for example.

Drive cycle refers, generally, to the time period from when the electrified vehicle is turned on to when the electrified vehicle reaches a destination and is turned off. A drive cycle and the predicted usage of the engine 22 can change when the electrified vehicle is moving—if a new destination is selected while driving, for example.

The controller 24 may calculate how the engine 22 will be utilized based on a distance to the destination. For example, if the destination is 80 miles away, and the electric drive system has a range of 50 miles, the controller 24 can calculate that the first drive system with the engine 22 will be required to drive the wheels 26 within this drive cycle. In this example, the second drive system or electric powertrain is initially used to drive the wheels 26 during the method 100.

In the method 100, the motor 18, the generator 20, or both generates electric power at a step 120 during the drive cycle via regenerative braking, for example. The controller 24 then directs a percentage of this power to the battery 14 and a percentage of this power to the heater element 28 at a step 130. The percentage may be from zero to one-hundred percent of the power generated by the generator 20. For example, the controller 24 may initially direct one-hundred percent of the electric power to the battery 14 to recharge the battery 14 leaving no power directed to the heater element 28.

At a step 140, the method 100 adjusts the flow in response to demand for the engine from the step 110. After the adjusting in the step 140, the controller 24 may direct seventy-five percent of the power from the generator 20 to the battery 14 and the remaining twenty-five percent to the heater element 28 to heat lubricants of the engine 22.

In addition to adjusting the flow in response to demand for the engine 22, the method 100 can make adjustments in response to a state of charge of the battery. For example, if the battery 14 state of charge is ninety-eight percent, the controller 24 may direct all the power from the generator 20 to the heater element 28.

The method 100 can make adjustments in response to temperature of the battery or engine. The method can further make adjustment in response to an ambient temperature. For example, if the ambient temperature is 110° F., the controller 24 may direct all the power from the generator 20 to the battery 14 since the engine 22 would likely be sufficiently heated due to the ambient temperature.

Figure 3:
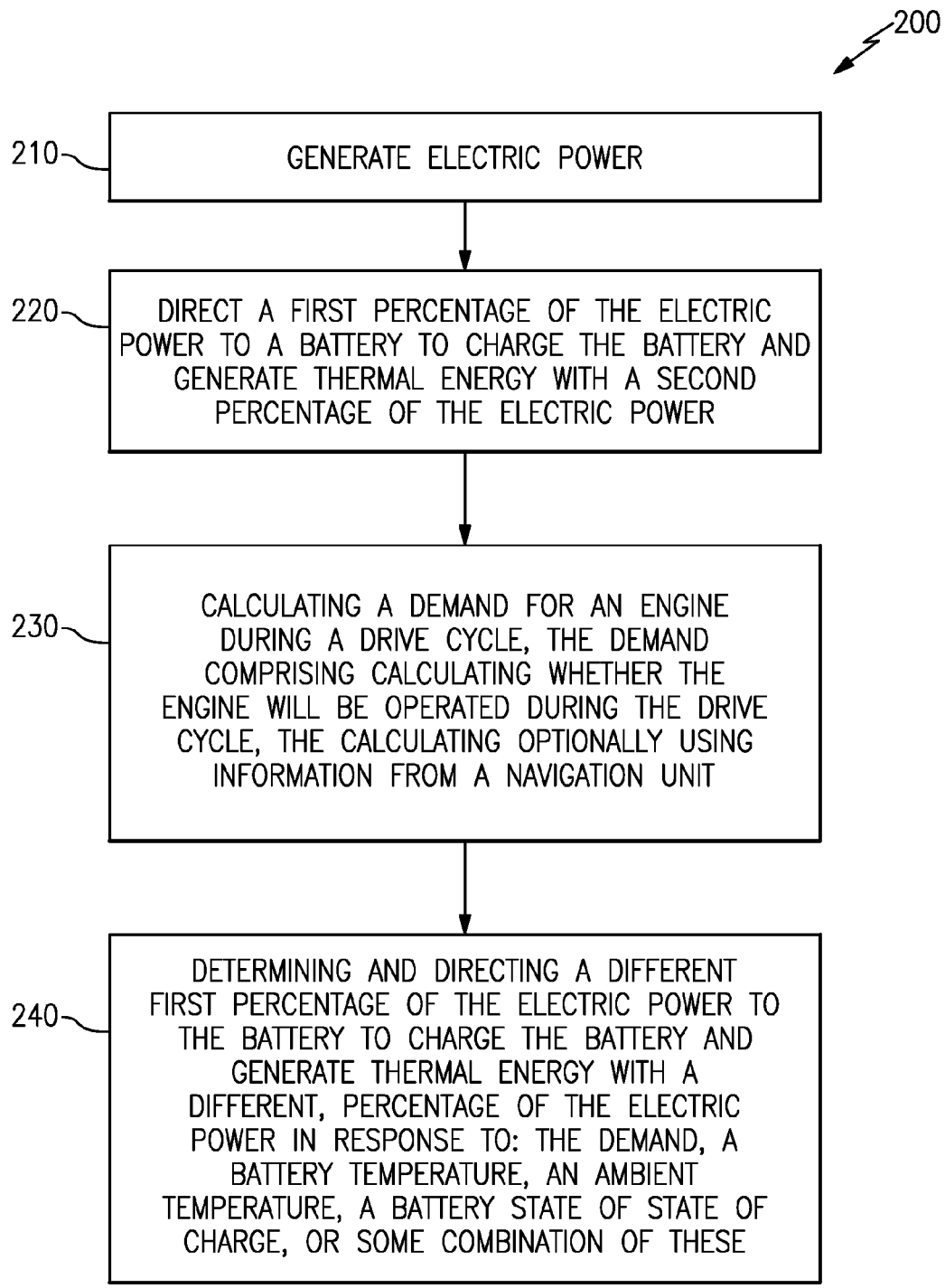
FIG. 3 illustrates a flow of another example method of directing power generated by the electrified vehicle powertrain.

Referring now to FIG. 3 with continued reference to FIG. 1, the controller 24 is configured to execute, in another example, a program that performs the steps of a method 200. In the method 200, a step 210 generates electric power. At a step 220, the method 200 directs a first percentage of the electric power to a battery to charge the battery and generates thermal energy with a second percentage of the electric power. At a step 230, the method 200 calculates a demand for an engine during a drive cycle. The demand comprises calculating whether the engine will be operated during the drive cycle. The calculating optionally uses information from a navigation unit. At a step 240, the method 200 determines and directs a different first percentage of the electric power to the battery to charge the battery and generates thermal energy with a different, percentage of the electric power in response to: the demand, a battery temperature, an ambient temperature, a battery state of state of charge, or some combination of these.

Features of the disclosed examples include heating an engine or fluids of an engine in response to a usage of an engine.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method, comprising:
    generating electric power with an electric machine of an electrified vehicle;
    directing a first percentage of the electric power to a first use and a second percentage of the electric power to a second use; and
    adjusting the first percentage and the second percentage in response to a predicted demand for an internal combustion engine of the electrified vehicle.

2. The method of claim 1, wherein the first use is charging a battery of the electrified vehicle and the second use is generating thermal energy.

3. The method of claim 2, further comprising heating a portion of the internal combustion engine with the thermal energy.

4. The method of claim 2, further comprising heating a fluid of the internal combustion engine with the thermal energy.

5. The method of claim 2, further comprising heating an area of the electrified vehicle with the thermal energy.

6. The method of claim 1, wherein the predicted demand for the internal combustion engine comprises calculating whether the internal combustion engine will be operated during a drive cycle.

7. The method of claim 6, further comprising using information from a navigation system when calculating whether the internal combustion engine will be operated during the drive cycle.

8. The method of claim 2, further comprising adjusting the directing in response to a state of charge of the battery.

9. The method of claim 2, further comprising adjusting the directing in response to a temperature of the battery.

10. The method of claim 1, further comprising adjusting the directing in response to an ambient temperature.

11. The method of claim 1, wherein the generating is provided by regenerative braking.

12. An electrified vehicle assembly, comprising:
an electric machine to generate a first percentage of electric power that is directed to a first device and a second percentage of electric power that is directed to a second device; and
a controller to change the first percentage and the second percentage in response to a predicted demand for an internal combustion engine.

13. The assembly of claim 12, wherein the first device is a battery of an electrified vehicle charged by the electric power and the second device is a heating element powered by the electric power to provide thermal energy.

14. The assembly of claim 13, further comprising a portion of the internal combustion engine heated by thermal energy from the heating element.

15. The assembly of claim 13, further comprising a fluid of the internal combustion engine heated by thermal energy from the heating element.

16. The assembly of claim 13, further comprising an area of the electrified vehicle heated by thermal energy from the heating element.

17. The assembly of claim 12, wherein the predicted demand for the internal combustion engine is based at least in part on whether the internal combustion engine will be operated during a drive cycle.

18. The assembly of claim 17, including a navigation system that calculates whether the internal combustion engine will be operated during the drive cycle.

19. The assembly of claim 13, wherein the controller further selectively directs electric power from the electric machine to the first device, the second device, or the combination of the first device and the second device, in response to a state of charge of the battery.

20. The assembly of claim 13, wherein the controller further selectively directs electric power from the electric machine to the first device, the second device, or the combination of the first device and the second device, in response to a temperature of the battery, an ambient temperature, or both.

* * * * *